(No Model.)
F. S. HUNTING.
TRANSFORMER.
No. 514,933. Patented Feb. 20, 1894.
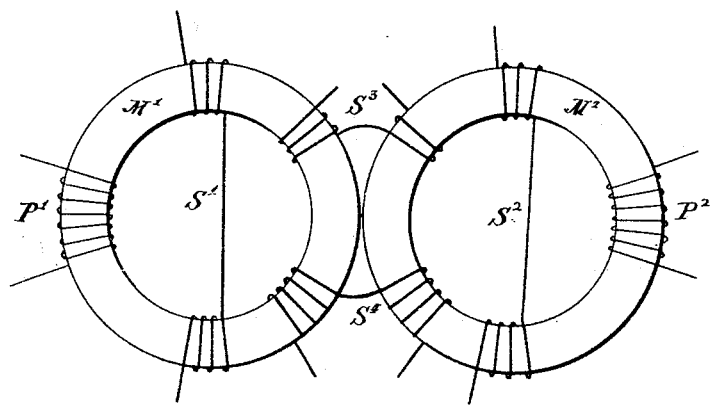
WITNESSES:
E. C. Grigg.
John T. Murphy
INVENTOR
Fred S. Hunting
BY Ross H. Read
his ATTORNEY

UNITED STATES PATENT OFFICE.

FRED S. HUNTING, OF FORT WAYNE, INDIANA.

TRANSFORMER.

SPECIFICATION forming part of Letters Patent No. 514,933, dated February 20, 1894.

Original application filed February 25, 1892, Serial No. 422,801. Divided and this application filed July 14, 1893. Serial No. 480,485. (No model.)

*To all whom it may concern:*

Be it known that I, FRED S. HUNTING, a citizen of the United States, residing in Fort Wayne, in the county of Allen and State of Indiana, have invented certain new and useful Improvements in Transformers, of which the following is a specification.

This invention relates to alternating current transformers, the object being to produce one or a number of independent currents of differing phase from two or more alternating currents of differing phase.

In carrying out the invention I prefer to operate with closed magnetic circuits in each of which the number of lines of force are caused to increase and decrease by the ebb and flow of the several alternating currents, and so wind the coils that a number of independent alternating currents may be produced in secondary circuits by the individual action or by the co-operation of groups of the several magnetic circuits.

In another application filed by me February 25, 1892, of which this application is a division, I have described several ways in which phasially differing alternating currents may be produced by the conjoint action of two or more alternating currents. The present application is directed to one of the modes of developing currents therein described, consisting in winding about two or more magnetic circuits individually a series of convolutions varying in number according to the amount of phase displacement desired and coupling the several groups of convolutions in the same circuit.

All patentable matter described in this specification and not claimed is disclaimed in favor of my prior application above referred to.

The several features of novelty will be more particularly hereinafter described in this specification and will be definitely indicated in the appended claims.

In the accompanying drawings which illustrate the invention is shown diagrammatically a plurality of magnetic circuits arranged in a manner suitable for carrying out my invention.

If $P'$ and $P^2$ represent two primary circuits supplied respectively with alternating currents differing in phase, or disposed in any other suitable manner so that the fluctuating magnetic impulses developed in the cores $M'$ and $M^2$ differ in time, then the secondary currents developed in circuits $S'$ and $S^2$ will differ in time period. If other circuits, as $S^3$ and $S^4$, be so arranged that part of their convolutions will inclose one magnetic core and part another, there will be developed in these circuits a resultant current due to the combined action of both magnetic cores, and this current may be given any desired degree of phase displacement with reference to the current in primary coils $P'$ or $P^2$ accordingly as the number of convolutions surrounding the respective cores is varied. For example, if, as is shown in circuit $S^4$, an equal number of convolutions is placed around each core, then there will be developed in circuit $S^4$ a resultant current having its phase half way between the phase of current in coils $P'$ and $P^2$. If the number of convolutions on the two cores vary in the proportion of three is to two, and be joined together as indicated by the coils $S^3$, the resulting current produced by these coils will be closer in phase to the current flowing in $P'$, providing the larger number of convolutions be placed as indicated in the diagram, upon the magnetic core controlled by coil $P'$. Thus, by varying the relative proportions of the two coils inclosing the two magnetic circuits, a resulting current of any desired phase displacement with reference to the phase of coils $P'$ and $P^2$ may be developed. It will thus be seen that by means of two magnetic circuits or cores in which magneto-motive-forces differing in phase are developed, we may produce any desired number of currents of differing phase and may produce a definite degree of phase displacement, and that the resultant current may in any case be shifted closer to the phase of magneto-motive-force in either core by increasing the inductive influence of said core upon the circuit carrying the resultant current.

In the organization shown in the diagram we will have four secondary currents developed from the primary coils $P'$ and $P^2$, and assuming that the currents flowing through these coils differ in phase, all of said secondary currents will differ in phase.

Having thus described my invention, what I claim as new, and desire to secure by Letters Patent, is—

1. Means for developing from two or more magnetic cores or circuits in which the magneto-motive-forces differ in phase an induced current of definite phase displacement, comprising a series of coils inclosing respectively the magnetic circuits, the number of convolutions in the several coils being apportioned to develop a resulting current of the desired phase.

2. Means for developing from two or more differential phase alternating currents a current of definite phase displacement comprising a plurality of independent magnetic cores or circuits influenced respectively by the currents of different phase, and a secondary coil having a portion of its convolutions inclosing each core, the number of convolutions being apportioned according to the desired phase displacement.

3. Means for developing from two or more differential phase alternating currents a current of definite phase displacement comprising a plurality of independent magnetic cores or circuits influenced respectively by the currents of different phase, and a secondary coil having a portion of its convolutions inclosing each core, the electro-motive-force in each portion being graduated to develop a resultant phase of the desired displacement.

In testimony whereof I have hereunto subscribed my name this 5th day of July, A. D. 1893.

FRED S. HUNTING.

Witnesses:
A. L. SEARLES,
CHAS. R. DRYER.